(12) United States Patent
Ishii

(10) Patent No.: US 10,186,871 B2
(45) Date of Patent: Jan. 22, 2019

(54) POWER CONTROL APPARATUS AND POWER CONDITIONER

(71) Applicant: Panasonic Intellectual Property Management Co., Ltd., Osaka (JP)

(72) Inventor: Yousuke Ishii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 15/183,171

(22) Filed: Jun. 15, 2016

(65) Prior Publication Data

US 2016/0294192 A1 Oct. 6, 2016

Related U.S. Application Data

(63) Continuation of application No. PCT/JP2015/000116, filed on Jan. 13, 2015.

(30) Foreign Application Priority Data

Feb. 27, 2014 (JP) .................................. 2014-037090

(51) Int. Cl.
*H02J 3/38* (2006.01)
*G05F 1/67* (2006.01)
(Continued)

(52) U.S. Cl.
CPC ................ *H02J 3/383* (2013.01); *G05F 1/67* (2013.01); *H02M 3/08* (2013.01); *H02M 7/44* (2013.01); *H02S 40/30* (2014.12); *Y02E 10/58* (2013.01)

(58) Field of Classification Search
CPC ..................................... H02J 3/383; H02J 3/38
(Continued)

(56) References Cited

U.S. PATENT DOCUMENTS

2009/0284240 A1* 11/2009 Zhang ...................... G05F 1/67
323/285
2011/0013432 A1 1/2011 Wagoner
(Continued)

FOREIGN PATENT DOCUMENTS

JP H07-31157 A 1/1995
JP 2010-219349 A 9/2010
(Continued)

OTHER PUBLICATIONS

International Search Report dated Apr. 7, 2015, issued in International Application No. PCT/JP2015/000116. (w/English translation).
(Continued)

*Primary Examiner* — Rexford Barnie
*Assistant Examiner* — Joseph Inge
(74) *Attorney, Agent, or Firm* — McDermott Will & Emery LLP

(57) ABSTRACT

A detector detects a peak of a power value in a current-voltage characteristic curve to DC power output from a solar battery module. A setting device, when a plurality of peaks is detected, when a current value is greater than a threshold value in a first peak having a maximum voltage value of the plurality of peaks, sets an operation point based on the first peak. The setting device, when the current value in the first peak is equal to or less than the threshold value, sets the operation point based on a second peak in which the voltage value is less than that in the first peak and the current value is greater than the threshold value, of the plurality of peaks. A power regulator regulates output of the DC power of the solar battery module in accordance with the operation point set.

9 Claims, 8 Drawing Sheets

(51) Int. Cl.
*H02S 40/30* (2014.01)
*H02M 3/08* (2006.01)
*H02M 7/44* (2006.01)

(58) Field of Classification Search
USPC .......................................................... 307/77
See application file for complete search history.

(56) References Cited

U.S. PATENT DOCUMENTS

2012/0126624 A1  5/2012  Hester et al.
2012/0262949 A1* 10/2012  Han ........................ H02J 3/385
                                                              363/16

FOREIGN PATENT DOCUMENTS

JP      2013-055132 A    3/2013
JP      2013-105318 A    5/2013

OTHER PUBLICATIONS

Syed Muhammad Raza Kazmi et al., "An improved and very efficient MPPT controller for PV systems subjected to rapidly varying atmospheric conditions and partial shading." Power Engineering Conference, 2009. AUPEC 2009. Australasian Universities. IEEE, 2009, 6 pgs.

Nabil A. Ahmed et al., "A novel maximum power point tracking for photovoltaic applications under partially shaded insolation conditions." Electric Power Systems Research, vol. 78, Issue 5 (2008): 777-784.

Hiren Patel and Vivek Agarwal, "Maximum power point tracking scheme for PV systems operating under partially shaded conditions." IEEE transactions on industrial electronics, vol. 55, No. 4 (2008): 1689-1698.

Extended European Search Report issued in corresponding EP Application No. 15754643.3, dated Mar. 17, 2017.

* cited by examiner

FIG. 2

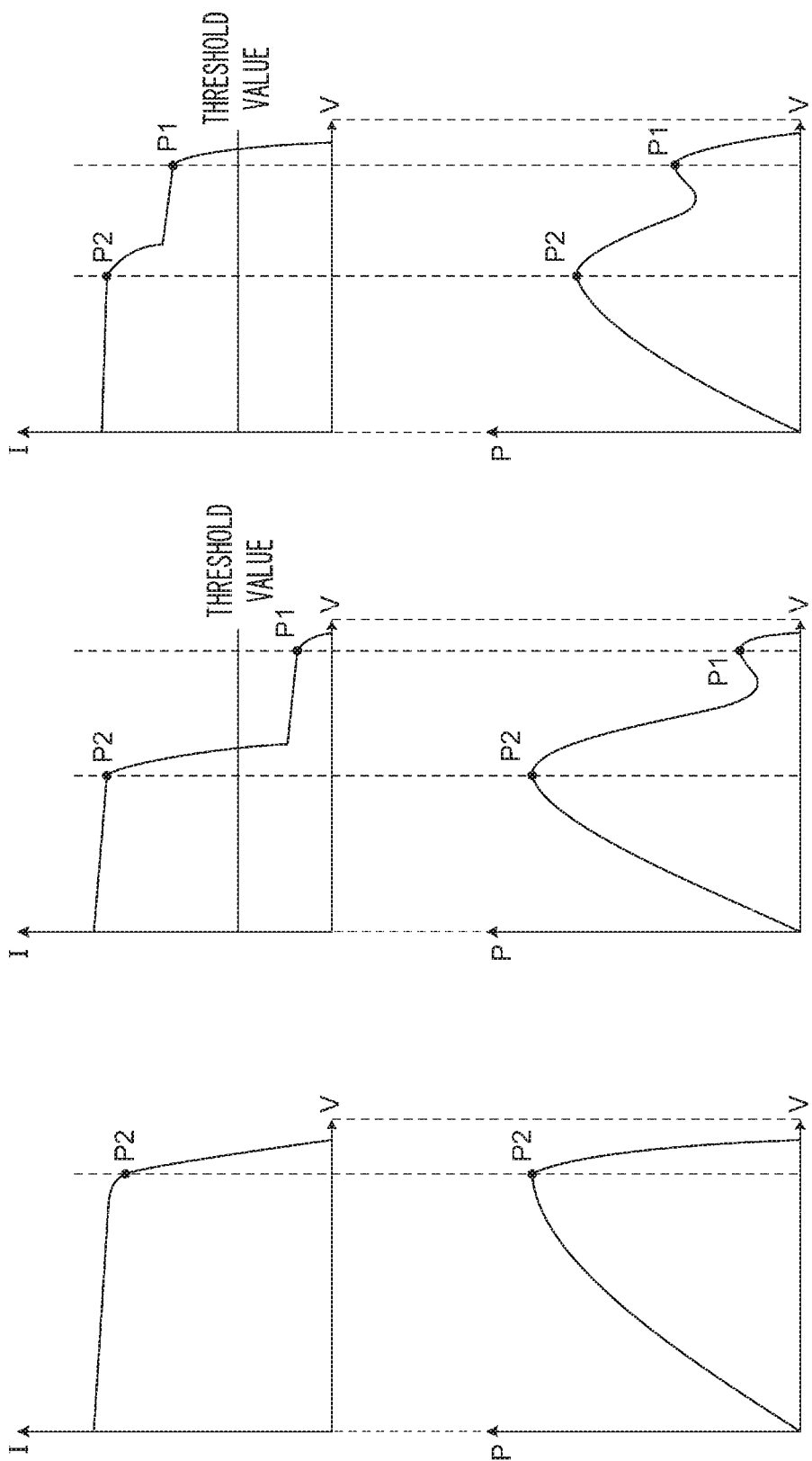

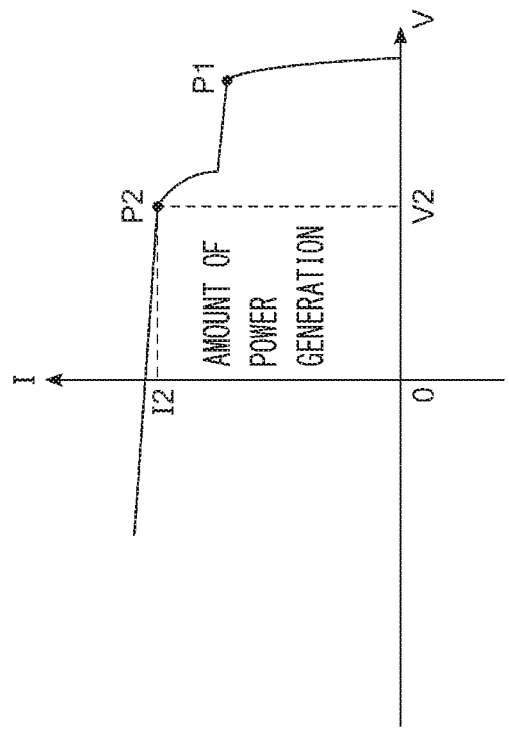
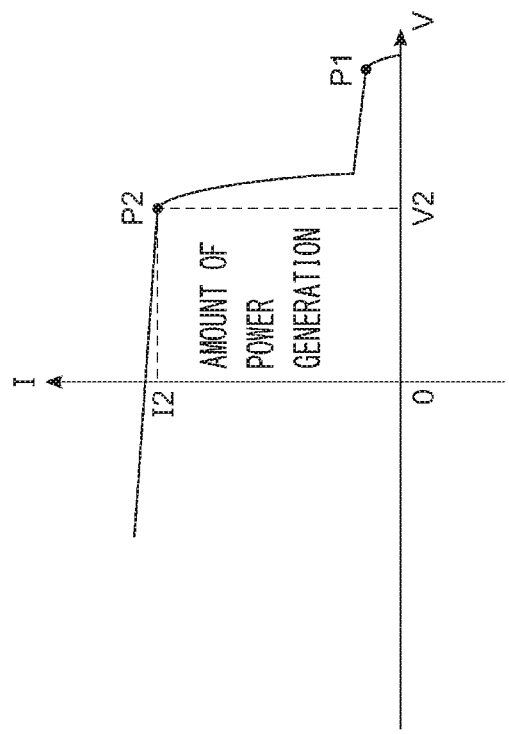

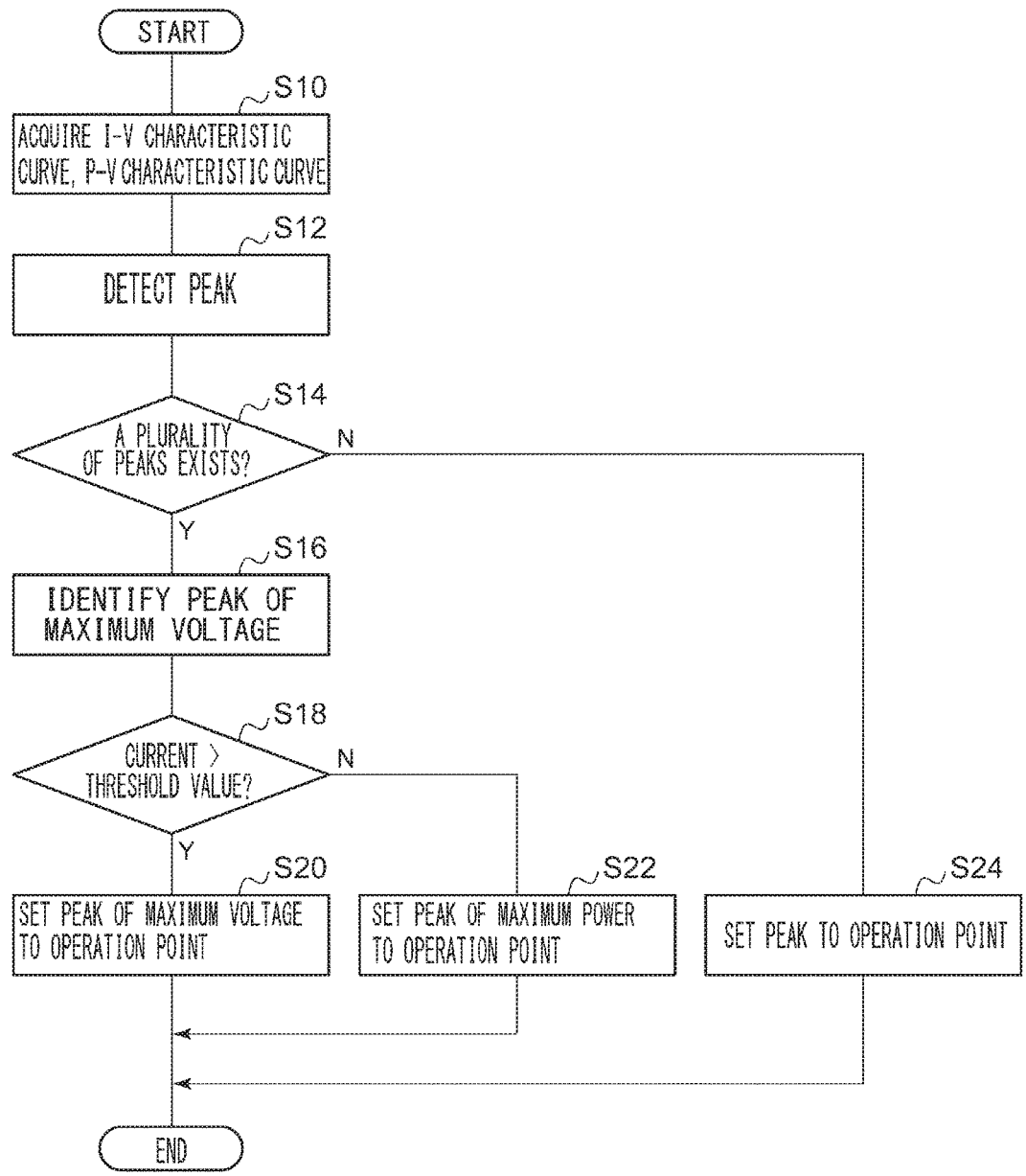

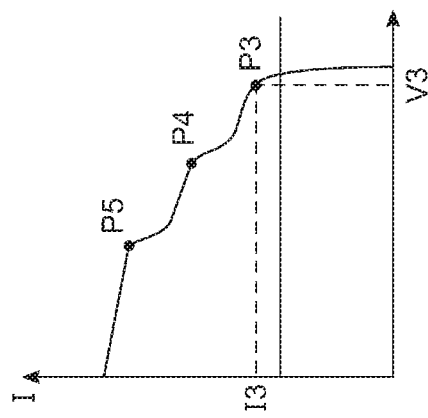
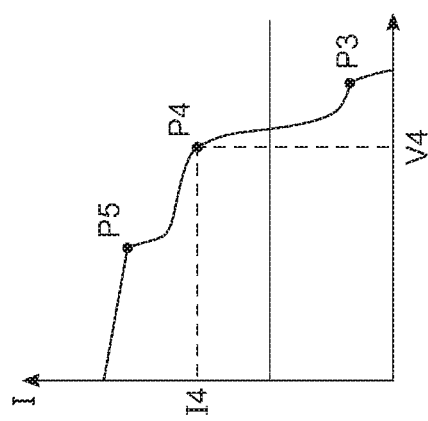
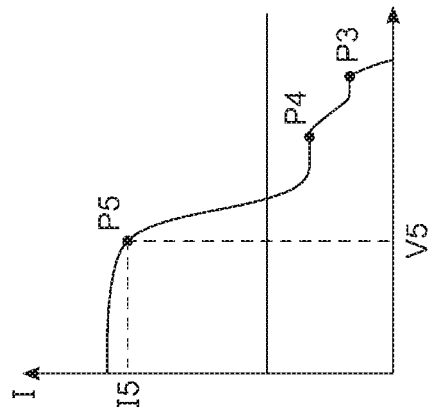

POWER CONTROL APPARATUS AND POWER CONDITIONER

CROSS-REFERENCE TO RELATED APPLICATION

This application is a Continuation of PCT/JP2015/000116, filed on Jan. 13, 2015, which in turn claims the benefit of priority from the prior Japanese Patent Application No. 2014-37090, filed on Feb. 27, 2014, the entire contents of which are incorporated herein by reference.

BACKGROUND

1. Field

The disclosure relates to a power control apparatus, and in particular, relates to a power control apparatus that controls output of a power source in which an amount of power generation fluctuates, such as a solar battery, and a power control apparatus and a power conditioner that converts DC power of the power source to AC power.

2. Description of the Related Art

As a photoelectric conversion apparatus that converts light energy to electric energy, development of a so-called solar battery is energetically performed in various fields. The solar battery is able to convert directly to electricity the light from the sun that is a clean and inexhaustible energy source, so that it is expected as a new energy source. A solar battery module is operated at optimum operating voltage with Maximum Power Point Tracking (MPPT) control processing by a microcomputer, and the light is converted to power according to a load or a commercial power system by an inverter (refer to JP hei07-31157 A, for example).

The solar battery module, generally, is controlled with an MPPT controller so that an operation point is a maximum output point. In the solar battery module, a plurality of solar battery cells is connected together in series, and current flowing through each of the solar battery cells is equal.

In such connection, when a solar battery cell appears in which a current value intends to be smaller due to influence of a shadow or a stain, a reverse bias is applied by another solar battery cell to increase the current value of the solar battery cell. At that time, a hot spot phenomenon occurs in which the solar battery cell to which the reverse bias is applied consumes power and is in a high temperature state.

SUMMARY

The present invention has been made in view of such circumstances, and aims to provide a technique that suppresses temperature increase when the hot spot phenomenon occurs, or when occurrence of the hot spot phenomenon is expected.

To solve the problem described above, a power control apparatus of an aspect of the present invention includes: a detector that detects a peak of a power value in a current-voltage characteristic curve to DC power output from a solar battery module; a setting device that, when a plurality of peaks is detected in the detector, (1) when a current value is greater than a threshold value in a first peak having a maximum voltage value of the plurality of peaks, sets an operation point based on the first peak, and (2) when the current value is equal to or less than the threshold value in the first peak, sets the operation point based on a second peak in which a voltage value is less than that in the first peak and the current value is greater than the threshold value, of the plurality of peaks; and a power regulator that regulates output of the DC power of the solar battery module in accordance with the operation point set in the setting device.

Another aspect of the present invention is also a power control apparatus. The apparatus includes: a detector that detects a peak of a power value in a current-voltage characteristic curve to DC power output from a solar battery module; a setting device that, when a plurality of peaks is detected in the detector, (1) when a current value is greater than a threshold value in a first peak having a maximum voltage value of the plurality of peaks, sets an operation point based on the first peak, and (2) when the current value is equal to or less than the threshold value, sets the operation point based on a second peak having a maximum power value of the plurality of peaks; and a power regulator that regulates output of the DC power of the solar battery module in accordance with the operation point set in the setting device.

The apparatus can further include an updater that updates the operation point set in the setting device. The power regulator can use the operation point updated in the updater for conversion, and the detector and setting device can operate in a period in which the updater stops.

The DC power input to the power regulator can be generated in the solar battery module in which cell groups are connected together in series and in which a bypass diode is connected in parallel to at least one cell group.

Yet another aspect of the present invention is a power conditioner. The power conditioner includes: a detector that detects a peak of a power value in a current-voltage characteristic curve to DC power output from a solar battery module; a setting device that, when a plurality of peaks is detected in the detector, (1) when a current value is greater than a threshold value in a first peak having a maximum voltage value of the plurality of peaks, sets an operation point based on the first peak, and (2) when the current value is equal to or less than the threshold value in the first peak, sets the operation point based on a second peak in which a voltage value is less than that in the first peak and a current value is greater than the threshold value, of the plurality of peaks; and a power regulator that converts the DC power of the solar battery module to AC power in accordance with the operation point set in the setting device.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 2 is a diagram illustrating a configuration of a solar battery module of FIG. 1.

FIGS. 4(a)-(c) are diagrams illustrating an operation summary of a setting device of FIG. 1.

FIGS. 5(a)-(b) are diagrams illustrating operation of the power control apparatus to be compared.

FIG. 7 is a flowchart illustrating a setting procedure by the setting device of FIG. 1.

FIGS. 8(a)-(c) are diagrams illustrating another operation of the power control apparatus of FIG. 1.

DETAILED DESCRIPTION

The invention will now be described by reference to the preferred embodiments. This does not intend to limit the scope of the present invention, but to exemplify the invention.

An embodiment is summarized before being described specifically. The present embodiment relates to a power control apparatus connected to a solar battery. As described above, the power control apparatus generally controls an operation point so that the operation point is a maximum output point. However, when influence of a cell of a shadow or a stain is increased, when the power control apparatus sets an operation point to be a maximum output point, a reverse bias applied to a solar battery cell is increased, and it is in a high temperature state. To cope with that, the power control apparatus according to the present example executes the following processing.

The power control apparatus periodically measures a current-voltage characteristic curve (hereinafter referred to as "I-V characteristic curve") to DC power from the solar battery, and acquires a peak of a power value. The peak of the power value corresponds to a local maximum value. In addition, when a plurality of peaks exists, it corresponds to the fact that there is the influence of the cell of the shadow or the stain. When the plurality of peaks exists, when a current value is equal to or less than a threshold value in a peak having a maximum voltage value, the influence of the cell of the shadow or the stain is small, so that the power control apparatus sets the operation point based on the maximum output point, as usual. On the other hand, when the current value is greater than the threshold value in the peak having the maximum voltage value, the influence of the cell of the shadow or the stain is large, so that the operation point is set based on the peak. Therefore, the maximum output point is not set for the operation point.

Figure 1:
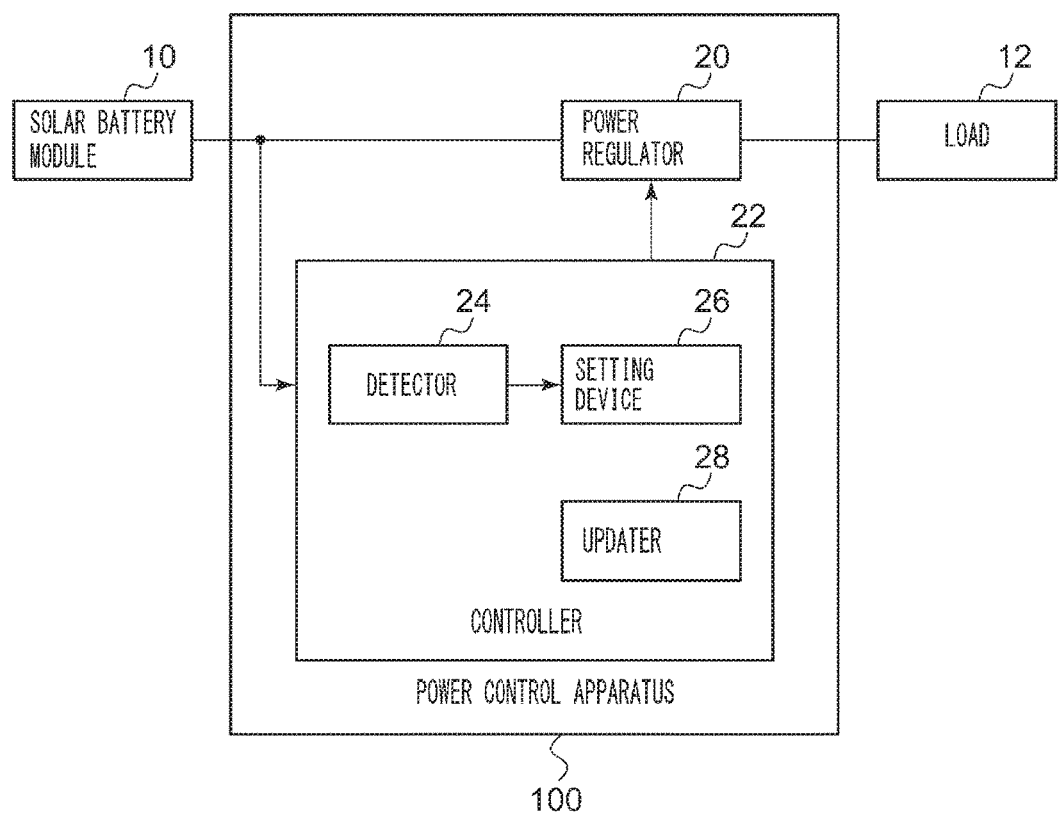
FIG. 1 is a diagram illustrating a configuration of a power control apparatus according to an example of the present invention.

FIG. 1 illustrates a configuration of a power control apparatus 100 according to the example of the present invention. The power control apparatus 100 is connected to a solar battery module 10, a load 12. The power control apparatus 100 includes a power regulator 20, a controller 22. The controller 22 includes a detector 24, a setting device 26, an updater 28. In the present embodiment, although an example is illustrated in which power regulated by the power control apparatus 100 is directly supplied to the load 12, the power regulated by the power control apparatus 100 can be supplied to the load 12 through a DC-DC converter (not illustrated).

The solar battery module 10 is power equipment that utilizes photovoltaic effect to convert light energy directly to power. The solar battery module 10 to be used includes a silicon solar battery, a solar battery whose material is various compound semiconductors or the like, and a dye-sensitized (organic solar battery). The solar battery module 10 outputs the DC power generated.

Figure 2:
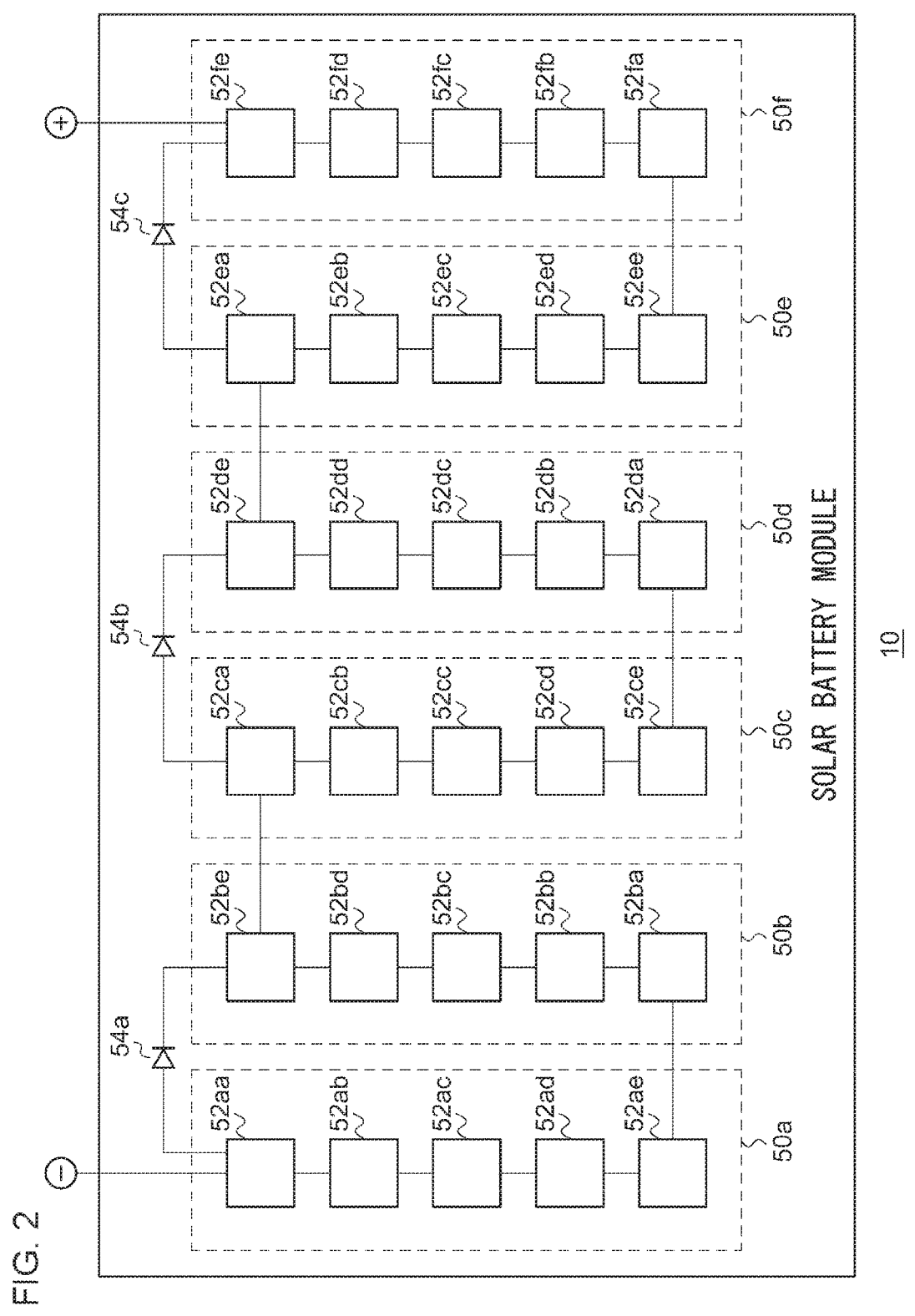

FIG. 2 illustrates a configuration of the solar battery module 10. The solar battery module 10 includes a cell group 50, a bypass diode 54. The cell group 50 is a collective term for a first cell group 50a, a second cell group 50b, a third cell group 50c, a fourth cell group 50d, a fifth cell group 50e, a sixth cell group 50f. The bypass diode 54 is a collective term for a first bypass diode 54a, a second bypass diode 54b, a third bypass diode 54c. The first cell group 50a includes an 11th cell 52aa, a 12th cell 52ab, a 13th cell 52ac, a 14th cell 52ad, a 15th cell 52ae. The second cell group 50b includes a 21th cell 52ba, a 22th cell 52bb, a 23th cell 52bc, a 24th cell 52bd, a 25th cell 52be. The third cell group 50c includes a 31th cell 52ca, a 32th cell 52cb, a 33th cell 52cc, a 34th cell 52cd, a 35th cell 52ce. The fourth cell group 50d includes a 41th cell 52da, a 42th cell 52db, a 43th cell 52dc, a 44th cell 52dd, a 45th cell 52de. The fifth cell group 50e includes a 51th cell 52ea, a 52th cell 52eb, a 53th cell 52ec, a 54th cell 52ed, a 55th cell 52ee. The sixth cell group 50f includes a 61th cell 52fa, a 62th cell 52fb, a 63th cell 52fc, a 64th cell 52fd, a 65th cell 52fe. The 11th cell 52aa, the 12th cell 52ab, and the like are collectively referred to as a cell 52.

In the solar battery module 10, "six" groups of the cell group 50 of from the first cell group 50a to the sixth cell group 50f are connected together in series. In addition, in each cell group 50, "five" cells of the cell 52 are connected together in series. Incidentally, the number of groups of the cell group 50 connected together in series, the number of cells of the cell 52 connected together in series are not limited thereto. Further, the bypass diode 54 is connected in parallel to two of the cell 52. For example, the first bypass diode 54a is connected in parallel to the first cell group 50a, the second cell group 50b.

The bypass diode 54 is disposed as a hot spot phenomenon countermeasure. The hot spot phenomenon is a phenomenon in which, when an object such as a fallen leaf adheres to the surface of the solar battery to be a shadow, the shadowed portion generates heat; the cell 52 may be damaged due to the phenomenon. That is because the cell 52 is connected together in series, so that current generated flows through the cell 52 in which an amount of power generation is small; however, the cell 52 shadowed is a resistive element, so that "heat" is generated when the current flows through the cell 52 shadowed. In addition, there is also a problem that, even if it is not damaged, the cell 52 that does not generate power is the resistive element and consumes the power generated by the other cell 52, and the amount of power generation is decreased. The amount of power generation is decreased further in addition to that the shadowed portion does not generate power. To reduce influence of such a phenomenon, the bypass diode 54 is connected in parallel to the cell 52. The description returns to FIG. 1.

Figure 3:
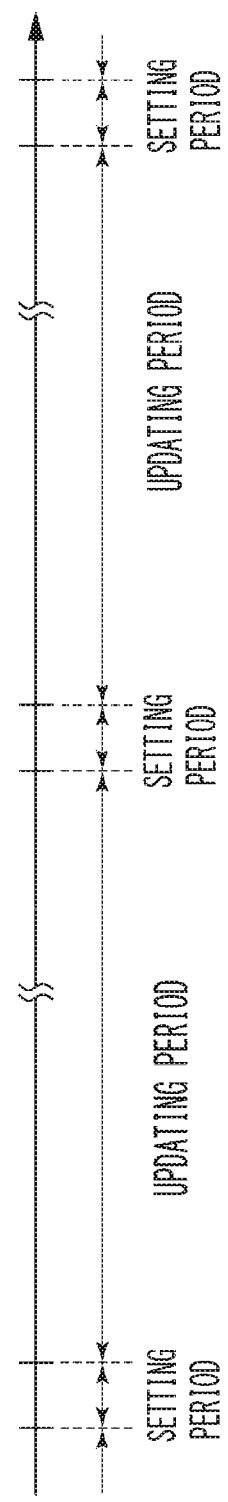
FIG. 3 is a diagram illustrating operation timing of the power control apparatus controlled by a controller of FIG. 1.

The controller 22 controls operation of the power control apparatus 100. FIG. 3 illustrates operation timing of the power control apparatus 100 controlled by the controller 22. The controller 22, as the operation timing of the power control apparatus 100, alternately switches between a setting period and an updating period. Incidentally, the length of the setting period is defined to be shorter than the length of the updating period. For example, of 24 hours, a few minutes is set as the setting period, and the remainder is set as the updating period. Processing in the setting period and the updating period is described later; however, a configuration can be made so that the DC power is not output from the power control apparatus 100 in the setting period, and a configuration can be made so that DC current that fluctuates based on control of the setting period is output from the power control apparatus 100. The description returns to FIG. 1.

Of the controller 22, the detector 24 and the setting device 26 operate in the setting period, and the updater 28 operates in the updating period. Therefore, the detector 24 and the setting device 26 operate in a period in which the updater 28 stops. In the following, operation in the setting period is described, and then operation in the updating period is described.

First, the operation in the setting period is described. The detector 24 inputs DC power from the solar battery module 10. The detector 24 measures an I-V characteristic curve to the DC power. For measurement of the I-V characteristic curve, a known technique can be used, so that description is omitted here. The detector 24 detects a peak of a power value in the I-V characteristic curve. Specifically, the detector 24 calculates a power-voltage characteristic curve (hereinafter referred to as "P-V characteristic curve") from the I-V characteristic curve, and detects a local maximum value of the power value while changing V. The local maximum value of the power value corresponds to the peak described above. When there is not a cell 52 in which the amount of power generation is small, one peak is detected; however, when there is the cell 52 in which the amount of power generation is small, a plurality of peaks is detected. The detector 24 outputs to the setting device 26 the I-V characteristic curve, the P-V characteristic curve, the peak detected.

The setting device 26 inputs from the detector 24 the I-V characteristic curve, the P-V characteristic curve, the peak detected. The setting device 26, when the number of peaks detected is one, sets an operation point based on the peak. FIGS. 4(*a*)-(*c*) illustrate an operation summary of the setting device 26. The upper part of FIG. 4(*a*) is an I-V characteristic curve of when the number of peaks detected is one, and the lower part of FIG. 4(*a*) is a P-V characteristic curve of when the number of peaks detected is one. Those correspond to the I-V characteristic curve and the P-V characteristic curve of when the hot spot phenomenon does not occur. From those, the setting device 26 sets P2 in which the power is the maximum, for the operation point. The description returns to FIG. 1.

The setting device 26, when a plurality of peaks is detected, when a current value is equal to or less than the threshold value in a first peak having a maximum voltage value, sets the operation point based on a second peak in which a voltage value is less than that of the first peak and a current value is greater than the threshold value, of the plurality of peaks. The upper part of FIG. 4(*b*) is an I-V characteristic curve of that case, and the lower part of FIG. 4(*b*) is a P-V characteristic curve of that case. Those correspond to examples of the I-V characteristic curve and the P-V characteristic curve of when the hot spot phenomenon occurs. The first peak corresponds to "P1," and the second peak corresponds to "P2." Two peaks in the lower part of FIG. 4(*b*) are local maximum values and are singular points. In addition, from the upper part of FIG. 4(*b*), it can be said that since the current value is equal to or less than the threshold value in P1, an amount of current is small of the cell in which the amount of power generation is small, and temperature increase is small of the cell in which the amount of power generation is small. Therefore, same as the case in which the hot spot phenomenon does not occur, the setting device 26 sets "P2" in which the power is the maximum, for the operation point. The description returns to FIG. 1.

The setting device 26, when a plurality of peaks is detected, when the current value is greater than the threshold value in the first peak having the maximum voltage value, sets the operation point based on the first peak. The upper part of FIG. 4(*c*) is an I-V characteristic curve of that case, and the lower part of FIG. 4(*c*) is a P-V characteristic curve of that case. Those also correspond to the examples of the I-V characteristic curve and the P-V characteristic curve of when the hot spot phenomenon occurs. The first peak corresponds to "P1," and the second peak corresponds to "P2." From the upper part of FIG. 4(*c*), it can be said that since the current value is greater than the threshold value in P1, the amount of current is large of the cell in which the amount of power generation is small, and the temperature increase is large of the cell in which the amount of power generation is small. Therefore, different from a case in which the hot spot phenomenon does not occur, the setting device 26 sets "P1" in which the power is lower than that in "P2" in which the power is the maximum, for the operation point. The description returns to FIG. 1. The setting device 26 sets the operation point to the power regulator 20 before the updating period starts.

Next, operation in the updating period is described. Before the setting period is switched to the updating period, the operation point of the power regulator 20 is set from the setting device 26. The power regulator 20 regulates DC power from the solar battery module 10 in accordance with the operation point set in the setting device 26. The DC power, as described above, is generated in the solar battery module 10 in which the cell groups 50 are connected together in series and in which the bypass diode 54 is connected in parallel to at least one cell group 50. In addition, for regulation of power in the power regulator 20, a known technique can be used, so that description is omitted here. The power regulator 20 outputs the DC power regulated to the load 12.

FIGS. 5(*a*)-(*b*) illustrate operation of the power control apparatus to be compared. Those, same as the above, correspond to the case in which the maximum output point is set for the operation point. FIG. 5(*a*) is an I-V characteristic curve of when the influence of the cell of the shadow or the stain is small, and FIG. 5(*b*) is an I-V characteristic curve of when the influence of the cell of the shadow or the stain is large. Those respectively correspond to the upper part of FIG. 4(*b*), and the upper part of FIG. 4(*c*). In any case of FIGS. 5(*a*)-(*b*), the operation point is set to "P2," so that the area of a rectangle surrounded by the origin "0," I2, P2, V2 is the amount of power generation. Therefore, in FIG. 5(*b*), current greater than that in the state of FIG. 5(*a*) flows through the cell 52 in which the amount of power generation is small in a state in which a reverse bias is added, so that possibility is increased to be in a high temperature state.

Figure 6A:
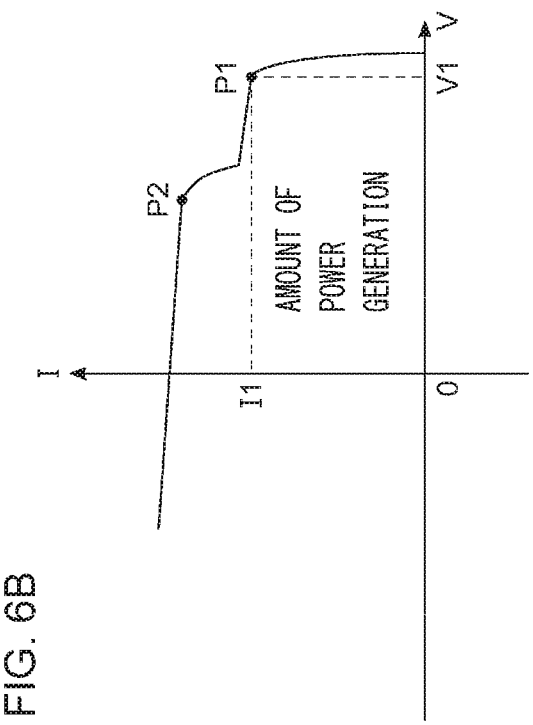
FIGS. 6(a)-(b) are diagrams illustrating operation of the power control apparatus of FIG. 1.
Figure 6B:
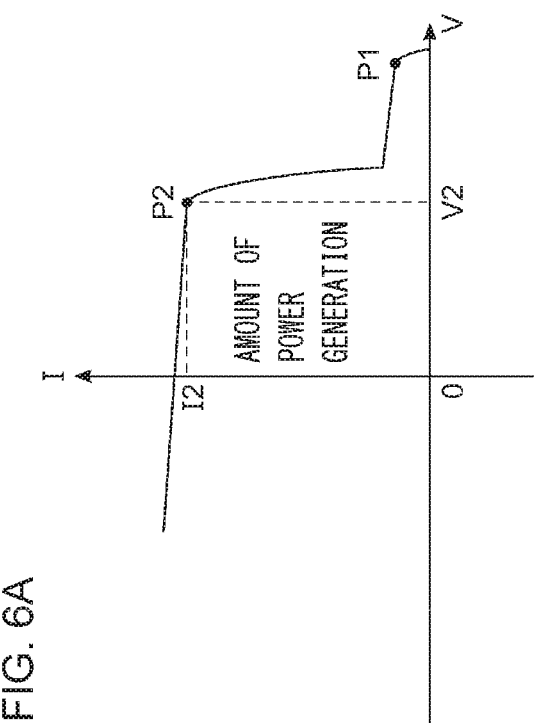

FIGS. 6(*a*)-(*b*) illustrates operation of the power control apparatus 100. FIGS. 6(*a*)-(*b*) correspond to FIGS. 5(*a*)-(*b*). In FIG. 6(*a*), the operation point is set to "P2," so that the amount of power generation in FIG. 6(*a*) is the area of a rectangle surrounded by the origin "0," I2, P2, V2. On the other hand, in FIG. 6(*b*), the operation point is set to "P1," so that the amount of power generation in FIG. 6(*b*) is the area of a rectangle surrounded by the origin "0," I1, P1, V1. Therefore, in FIG. 6(*b*), current of I1 smaller than I2 flows through the cell 52 in which the amount of power generation is small in a state in which a reverse bias smaller than that in a state of FIG. 5(*b*) is added, so that possibility is decreased to be in a high temperature state. The description returns to FIG. 1.

The load 12 is DC drive type electric equipment. The load 12 is operated by DC power from the power regulator 20.

In the following, operation continuously performed in the updating period is described. The updater 28 receives the operation point set in the setting device 26 before being switched to the updating period from the setting period. The updater 28 updates the operation point set in the setting device 26 over the updating period. For example, the updater 28 updates the operation point to increase a power value of AC power by executing the Hill Climbing Method. That can be said that it is the MPPT to a peak corresponding to the operation point set in the setting device 26. The updater 28 sets the operation point updated to the power regulator 20. The power regulator 20 executes regulation of output of the DC power by using the operation point updated in the updater 28.

Operation is described of the power control apparatus 100 with the above configuration. FIG. 7 is a flowchart illustrating a setting procedure by the setting device 26 in the setting period. The detector 24 acquires the I-V characteristic curve and the P-V characteristic curve (S10), and detects the peak (S12). When a plurality of peaks exists (S14: Y), the setting device 26 identifies a peak in which the voltage is the maximum (S16). When the current>the threshold value is true (S18: Y), the setting device 26 sets the peak in which the voltage is the maximum, for the operation point (S20). When the current>the threshold value is not true (S18: N), the setting device 26 sets the peak in which the power is the maximum, for the operation point (S22). When the plurality of peak does not exist (S14: N), the setting device 26 sets the peak for the operation point (S24).

According to the example of the present invention, when the current value in the first peak having the maximum voltage value is equal to or less than the threshold value, the operation point is set based on the second peak having the maximum power value, so that the power to be output can be increased. In addition, the power to be output is increased, so that power generation efficiency of the solar battery module can be increased. In addition, when the current value in the first peak having the maximum voltage value is greater than the threshold value, the operation point is set based on the first peak, so that occurrence of the hot spot phenomenon can be suppressed. In addition, the temperature increase is suppressed, so that a long life of the solar battery module can be achieved. In that case, the power to be output is smaller than that in a case in which the operation point is set based on the second peak. However, by comparing the current value in the first peak with the threshold value, even when the operation point is set based on the first peak, a significant decrease in the power to be output can be prevented. In addition, the I-V characteristic curve is measured while the operation for updating the operation point is stopped, so that another peak can be detected. In addition, even when the cell groups are connected together in series, a bypass diode is connected in parallel to at least one cell group, so that influence of current inflow to the cell due to the hot spot phenomenon can be reduced.

The present invention has been described based on the example. The example is an exemplification, and it is understood by those skilled in the art that various modifications are possible for combination of each of the components or each of the processes, and the modifications are also within the scope of the present invention.

In the present embodiment, the power regulator 20 is configured to output to the load 12 DC power in which the DC power output from the solar battery module is regulated. However, not limited thereto, the power regulator 20 can be configured to convert the DC power output from the solar battery module to AC power based on the operation point set from the setting device 26, to output to the load 12. Such a power control apparatus 100 having a function that converts DC power to AC power is called a power conditioner. The control included in the setting device 26 described in the present embodiment can be applied to the power conditioner.

In the present embodiment, as the case in which the hot spot phenomenon occurs, FIGS. 4(*b*)-(*c*), FIGS. 5(*a*)-(*b*), FIG. 6(*a*)-(*b*) are illustrated, and two peaks exist. However, not limited thereto, for example, three or more peaks can exist. Even in that case, when the current value is greater than the threshold value in the peak having the maximum voltage value, the operation point is set based on the peak having the maximum voltage value; when the current value is less than the threshold value in the peak having the maximum voltage value, the operation point is set based on the peak in which the voltage value is less than that in the peak having the maximum voltage value and the current value is greater than the threshold value. According to the modification, even in various conditions, the temperature increase due to the hot spot phenomenon can be suppressed.

FIGS. 8(*a*)-(*c*) illustrate operation of the power control apparatus 100 of when three peaks exist. The solar battery module that indicates the I-V characteristics of FIGS. 8(*a*)-(*c*) has at least two of the cell 52 in which the amount of power generation is small. The at least two of the cell 52 in which the amount of power generation is small are each connected in parallel to different bypass diodes. In order from the one that indicates the maximum voltage value, a third peak, a fourth peak, a fifth peak exist, and the third peak corresponds to "P3," the fourth peak corresponds to "P4," the fifth peak corresponds to "P5."

From FIG. 8(*a*), it can be said that, since the current values are equal to or less than the threshold value in "P3," "P4," the amount of current is small of the cell in which the amount of power generation is small, and the temperature increase is small of the cell in which the amount of power generation is small. Therefore, same as the case in which the hot spot phenomenon does not occur, the setting device 26 sets "P5" in which the power is the maximum, for the operation point.

From FIG. 8(*b*), it can be said that, since the current value is equal to or less than the threshold value in "P3," the amount of current is small in one of the cells in which the amount of power generation is small, and the temperature increase is small in the one of the cells. However, it can be said that, since the current value is greater than the threshold value in "P4," the amount of current is large in the other of the cells in which the amount of power generation is small, and the temperature increase is large in the other of the cells. Therefore, the setting device 26 sets "P4" in which the voltage value is smaller than that in "P3" having the maximum voltage value, and the current value is greater than the threshold value, for the operation point.

From FIG. 8(*c*), it can be said that, since the current values are greater than the threshold value in "P3," "P4," the amount of current is large in the cell in which the amount of power generation is small, and the temperature increase is large in the cell in which the amount of power generation is small. Therefore, the setting device 26 sets "P3" having the maximum voltage value for the operation point.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A power control apparatus comprising:
 a detector that detects a peak of a power value in a current-voltage characteristic curve to DC power output from a solar battery module;
 a setting device that, when a plurality of peaks is detected by the detector, (1) when a current value is greater than a threshold value at a first peak having a maximum voltage value of the plurality of peaks, sets an operation point based on the first peak, and (2) when the current value is equal to or less than the threshold value at the first peak, sets the operation point based on a second peak in which a voltage value is less than that of the first peak and a current value is greater than the threshold value, of the plurality of peaks; and
 a power regulator that regulates output of the DC power of the solar battery module in accordance with the operation point set in the setting device, wherein
 a power value of the first peak is less than that of the second peak.

2. A power control apparatus comprising:
 a detector that detects a peak of a power value in a current-voltage characteristic curve to DC power output from a solar battery module;
 a setting device that, when a plurality of peaks is detected by the detector, (1) when a current value is greater than a threshold value at a first peak having a maximum voltage value of the plurality of peaks, sets an operation point based on the first peak, and (2) when the current value is equal to or less than the threshold value, sets the operation point based on a second peak having a maximum power value of the plurality of peaks; and
 a power regulator that regulates output of the DC power of the solar battery module in accordance with the operation point set in the setting device, wherein
 a power value of the first peak is less than that of the second peak.

3. The power control apparatus according to claim 1, further comprising
 an updater that updates the operation point set in the setting device, wherein:
 the power regulator uses the operation point updated in the updater for conversion; and
 the detector and the setting device operate in a period in which the updater stops.

4. The power control apparatus according to claim 2, further comprising
 an updater that updates the operation point set in the setting device, wherein:
 the power regulator uses the operation point updated in the updater for conversion; and
 the detector and the setting device operate in a period in which the updater stops.

5. The power control apparatus according to claim 1, wherein the DC power input to the power regulator is generated in the solar battery module in which cell groups are connected together in series and in which a bypass diode is connected in parallel to at least one cell group.

6. The power control apparatus according to claim 2, wherein the DC power input to the power regulator is generated in the solar battery module in which cell groups are connected together in series and in which a bypass diode is connected in parallel to at least one cell group.

7. The power control apparatus according to claim 3, wherein the DC power input to the power regulator is generated in the solar battery module in which cell groups are connected together in series and in which a bypass diode is connected in parallel to at least one cell group.

8. The power control apparatus according to claim 4, wherein the DC power input to the power regulator is generated in the solar battery module in which cell groups are connected together in series and in which a bypass diode is connected in parallel to at least one cell group.

9. A power conditioner comprising:
 a detector that detects a peak of a power value in a current-voltage characteristic curve to DC power output from a solar battery module;
 a setting device that, when a plurality of peaks is detected by the detector, (1) when a current value is greater than a threshold value at a first peak having a maximum voltage value of the plurality of peaks, sets an operation point based on the first peak, and (2) when the current value is equal to or less than the threshold value at the first peak, sets the operation point based on a second peak in which a voltage value is less than that in the first peak and a current value is greater than the threshold value, of the plurality of peaks; and
 a power regulator that converts the DC power of the solar battery module to AC power in accordance with the operation point set in the setting device, wherein
 a power value of the first peak is less than that of the second peak.

* * * * *